Figure 1:
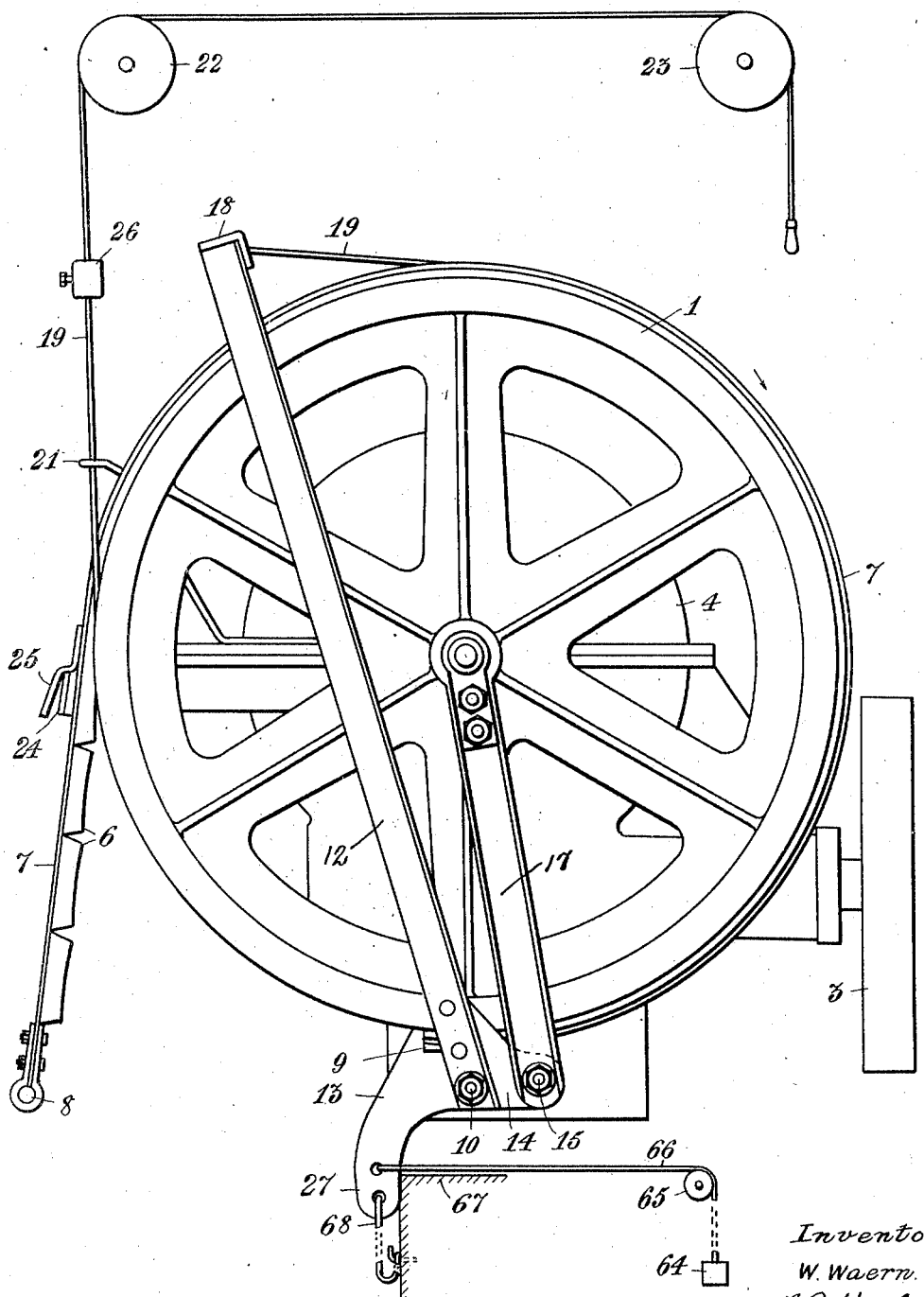

W. WAERN.
FRICTION CLUTCH.
APPLICATION FILED DEC. 26, 1918.

1,334,685.

Patented Mar. 23, 1920.
5 SHEETS—SHEET 1.

Inventor
W. Waern.
By A. R. Kerslake
Atty.

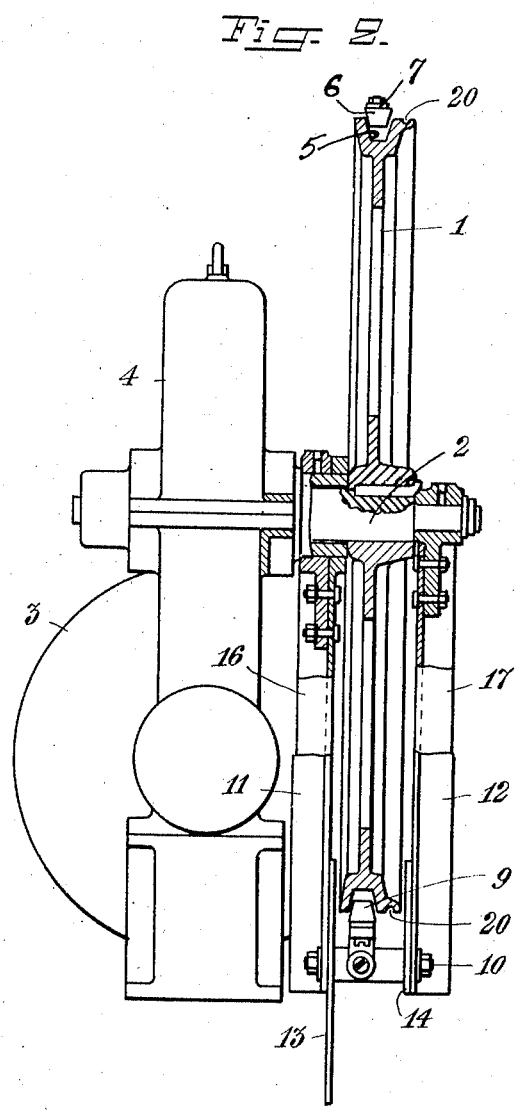

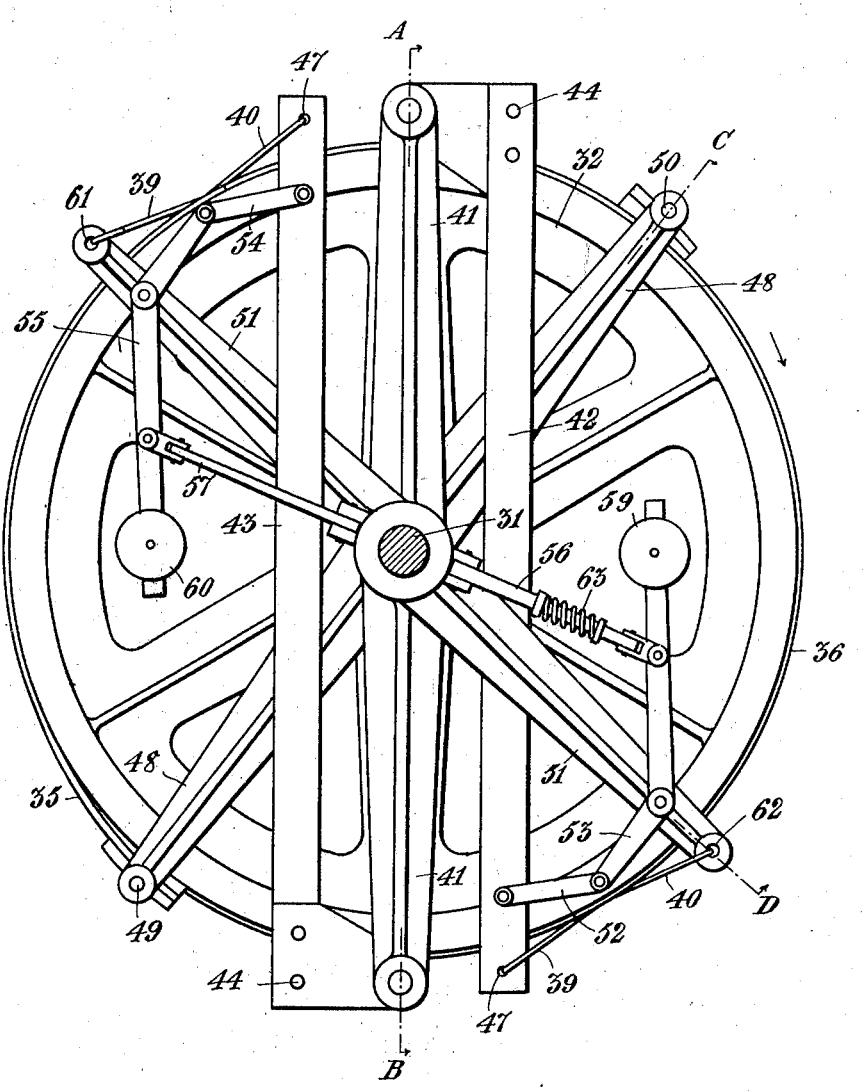

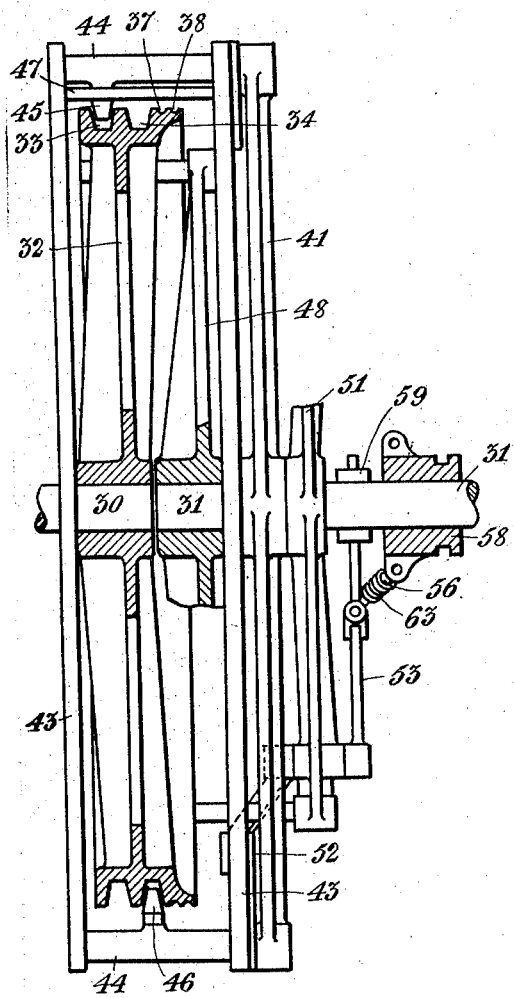
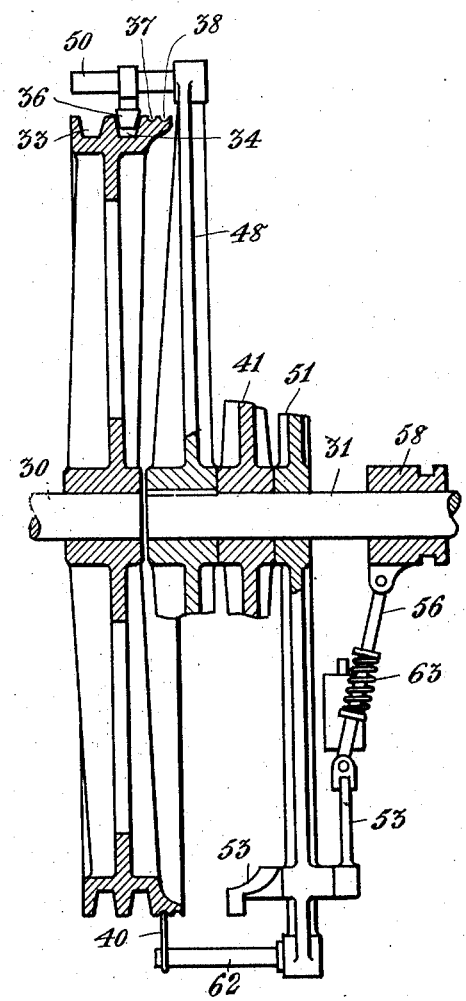

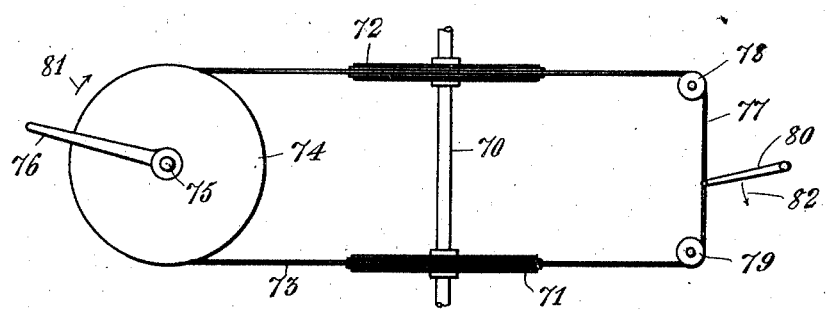
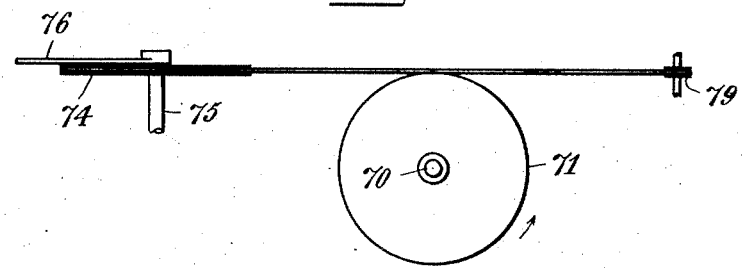

UNITED STATES PATENT OFFICE.

WILLIAM WAERN, OF STOCKHOLM, SWEDEN.

FRICTION-CLUTCH.

1,334,685.  Specification of Letters Patent.  Patented Mar. 23, 1920.

Application filed December 26, 1918. Serial No. 268,385.

*To all whom it may concern:*

Be it known that I, WILLIAM WAERN, subject of the King of Sweden, residing at 18 Rörstrandsgatan, Stockholm, Sweden, have invented certain new and useful Improvements in Friction-Clutches, of which the following is a specification.

The invention has for its object to provide a friction clutch which, even when used for transmitting a considerable amount of power, can be connected and disconnected by means of a relatively small power. To this end the driving and the driven parts of the clutch are connected with each other by means of a coupling operating wire, band or the like placed around the periphery of a friction wheel and by the pulling of which said parts are coupled together. In order to further reduce the ratio between the operating power and the pressure with which the adjustable part of the clutch is actuated, the latter part may be connected with the operating wire through a lever transmission. In a preferred embodiment of the invention the driving part consists of a friction wheel and the driven part of a friction or clutch band arranged on said wheel and to one end of which the load is connected, while the other end can be forced against the friction wheel by means of a lever transmission pivoted to the driving shaft, said transmission being in turn actuated by an operating wire wound around the periphery of said friction wheel. Said operating wire is connected at one end with said lever transmission and at the other end with a suitable device for operating the clutch by pulling the wire.

On the accompanying drawings Figures 1 and 2 show a side view and a cross section respectively of an embodiment of the invention. Figs. 3, 4 and 5 illustrate another embodiment, Fig. 4 showing a section on the line A—B and Fig. 5 a section on the line C—D in Fig. 3. Figs. 6 and 7 show different applications of the friction clutch according to the invention.

In Figs. 1 and 2 1 designates a friction wheel keyed on to a shaft 2 which is driven from a pulley 3 by means of a worm gear inclosed in a casing 4. The friction wheel is provided at its periphery with a groove 5 in which a clutch band 7 provided with wood blocks 6, is provided. Fastened to one end of said clutch band is a loop 8 adapted to be connected with the load, for instance a weight, which is to be moved or lifted. The other end of the clutch band is connected with a clutch shoe 9 of cast iron pivoted on a journal 10 provided between the ends of two arms 11 and 12 of angle iron arranged on both sides of the friction wheel 1. The arms 11 and 12 are in turn swingably mounted on a journal 15 by means of two plates 13 and 14 respectively fixed to the arms. The journal 15 connects the ends of two arms 16 and 17 of a U-shaped cross section arranged on each side of the friction wheel and swingably mounted on the shaft 2. At their upper ends the arms 11 and 12 are connected together by means of a bar 18 to which one end of the wire 19 is fastened. This wire is placed in a groove 20 on the periphery of the friction wheel and passed through a guide 21 projecting from the casing 4 and further in a suitable manner, for instance over pulleys 22, 23, to the place from which the clutch is operated. The friction wheel rotates in the direction indicated by the arrow.

To bring the clutch into operation the wire 19 is pulled so that it is stretched around the friction wheel the wire being then carried around through the friction and the arms 11 and 12 are swung on the journal 15 so that the clutch shoe 9 is forced against the friction wheel. The clutch band 7 is then also carried around with the friction wheel whereby the load is lifted. The clutch is disconnected as soon as the pulling of the wire 19 ceases. If the free end of the wire 19 is maintained in the fixed position, also the load is kept in a corresponding position owing to the friction between the friction wheel and the band 7. By releasing the wire 19 slowly the load may be slowly brought back to the starting position. In case the band 7 is actuated by no load, it is returned to its normal position by a weight 64 and a wire 66 passing over a pulley 65 and fastened to the arm 27, the movement being then limited partly by a fixed abutment 67, partly by an arm 24 projecting from the frame of the machine and coöperating with a stopping device 25 provided on the band, in such a way that the band is lifted out of contact with the friction wheel 1. A stopping device 26 adjustably connected with the wire 19 and coöperating with the arm 21, serves to keep the wire 19 in a suitable normal position after the latter has been returned by its own weight.

The length of the stroke of the brake band 7 is automatically limited by means of a rope 68 fastened to the arm 27 and the abutment 67, said rope, when being stretched, operating to turn the brake shoe 9 on the journal 15 so that the shoe is brought out of contact with the friction wheel.

The power by which the wire 19 must be operated when the clutch is to be connected, is only a fraction of the power acting in the loop 8, and in the example shown said power is about 500 times less than the power last mentioned. By winding the wire 19 a number of turns around the periphery of the friction wheel the ratio between said powers may be further diminished.

Figs. 3–5 show a friction clutch according to the invention by means of which two co-axial shafts 30 and 31 may be clutched together. The driving shaft 30 carries a friction wheel 32 rotating with the shaft and provided with two grooves 33 and 34 for two brake bands 35 and 36 corresponding to the band 7 in Figs. 1 and 2, and two other grooves 37 and 38 for wires 39 and 40 corresponding to the wire 19 in Figs. 1 and 2.

Loosely mounted on the driven shaft 31 is a support 41 the opposite ends of which form bearings for two levers 42 and 43 corresponding to the levers 11, 12 in Figs. 1 and 2. Said levers comprise two side bars arranged on each side of a friction wheel and connected together at one end by means of a journal 44 carrying the brake shoe 45 and 46 respectively. At the other end said bars are kept together by means of a journal 47 to which one end of the corresponding wire 39 and 40 is fastened. Keyed on to the shaft 31 is a driver 48 which by means of pins 49 and 50 is connected with the ends of the brake bands 35 and 36. The shaft 31 also carries an arm 51 loosely arranged on the shaft and at the ends of which the wires 39 and 40 are fastened to pins 61 and 62 respectively. Said arm is connected with the levers 42 and 43 by means of a toggle lever 52, 53 and 54, 55 respectively one link 53 and 55 respectively of which is made in the form of a two armed lever and connected with a sleeve 58 slidably arranged on the shaft 31, by means of links 56 and 57 respectively. The levers 53 and 55 are provided with adjustable weights 59 and 60 respectively.

The clutch operates in the following manner. On displacing the sleeve 58 on the shaft 31 against the clutch the toggle levers 52, 53 and 54, 55 are straightened out the wires 39 and 40 being then stretched and carried around by the friction wheel 32 together with the arm 51 and the levers 42 and 43 the friction wheel being rotated in the direction of the arrow. The clutch shoes 45 and 46 are therefore forced against the friction wheel 32 so that also the clutch bands 35 and 36 are clutched to the friction wheel the shaft 31 being then driven by means of driver 48. As soon as all parts are brought in rotation, the clutch is maintained in operating position by the centrifugal force acting on the weights 59 and 60, as the wires 39 and 40 will then be kept stretched. The clutch is disconnected by moving the sleeve 58 back to its normal position. By making one link 56 of two parts adjustably connected with each other by means of a spring 63 an automatic compensation for an equal wear of the two halves of the friction clutch is obtained, so that both halves always transmit an equal power.

Constructed according to Figs. 3–5 with the different parts arranged symmetrically the clutch can be properly balanced so that it may be used also at high speeds of rotation. As the friction devices are forced into operating position by the action of the centrifugal force, the clutch may also be used as an automatic clutch as for instance a motor clutch. The shaft 30 is then driven by the continuously running motor and the shaft 31 by the auxiliary motor. After the latter has been started and obtained a certain speed, the shaft 31 is automatically connected with the shaft 30 by the centrifugal force acting on the weights 59 and 60. In a similar way the disconnection may be effected automatically, as soon as the speed of the auxiliary motor decreases.

In case of low speeds of rotation the clutch need not be constructed symmetrically according to Figs. 3–5 and in such cases a single clutch band may be used in accordance with Figs. 1 and 2.

The parts 51—60 may also be provided on the opposite side of the friction wheel 32.

A clutch according to the invention may be used with advantage in pile drivers, winches and the like. Figs. 6 and 7 show schematically plan views of an arrangement which may be used on vessels for operating the rudder.

Mounted on the same motor driven shaft 70 are two clutches 71 and 72 of the kind shown in Figs. 1 and 2. The wire 73, which corresponds to the wire 19 in Fig. 1, is connected with a steering device consisting of a disk 74 which may be rotated on a shaft 75 by means of an arm 76 and around which the wire 73 is wound. The wire 77 is connected with the ends of the clutch band 7, Fig. 1, and passes over guide pulleys 78 and 79 to the rudder 80 to which it is connected. On turning the arm 76 in the direction of the arrow 81 the clutch 71 is brought into operation, while the clutch 72 is out of operation. The clutch 71 will then remain operated as long as a certain pressure is exerted on the arm 76. The rudder is then turned by the wire 77 in the direction of the arrow 82. On turning the arm 76 in the opposite direction the rudder is reversed as the clutch 72 will then come into operation, while the clutch 71 is disconnected. If the arm 76 is maintained in a certain position, also the rudder is maintained in a corresponding position.

Having now described my invention and in what manner the same is to be performed I declare that what I claim is:—

1. In a hoist or pulling device the combination with a driving part consisting of a friction wheel and a driven part consisting of a friction member adjustable against the friction wheel, of means for operating said friction member to connect said driving and driven parts comprising an operating wire arranged to be pulled into frictional engagement with the periphery of the friction wheel and a lever transmission connecting one end of said wire with the friction member.

2. In a hoist or pulling device the combination with a driving part consisting of a friction wheel, and a driven part consisting of a clutch band arranged around the friction wheel, and a friction member attached to the clutch band and adjustable against the periphery of said wheel, of means for moving said friction member into frictional engagement with the wheel comprising an operating wire arranged to be tightened around the periphery of the friction wheel and a lever transmission connecting one end of said wire with the friction member.

3. In a hoist or pulling device the combination with a driving part consisting of a friction wheel and a driven part consisting of a friction member adjustable against the periphery of the friction wheel, of means for operating said friction member to connect said driving and driven parts comprising an operating wire arranged to be pulled into frictional engagement with the periphery of the friction wheel and a lever carrying the friction member and connected at one end with said operating wire, said lever being pivoted to an arm extending from the shaft of the friction wheel.

In testimony whereof I affix my signature in presence of two witnesses.

WILLIAM WAERN.

Witnesses:
JACOB BAGGE,
CHARLES H. LAFELY.